July 14, 1931. C. A. LINTON 1,814,603
ART OF THE TRANSMISSION OF SOUND WAVES
Filed Aug. 4, 1927  7 Sheets-Sheet 1

INVENTOR
Chester Alfred Linton

July 14, 1931. C. A. LINTON 1,814,603
ART OF THE TRANSMISSION OF SOUND WAVES
Filed Aug. 4, 1927 7 Sheets-Sheet 4

INVENTOR
Chester Alfred Linton

INVENTOR
Chester Alfred Linton

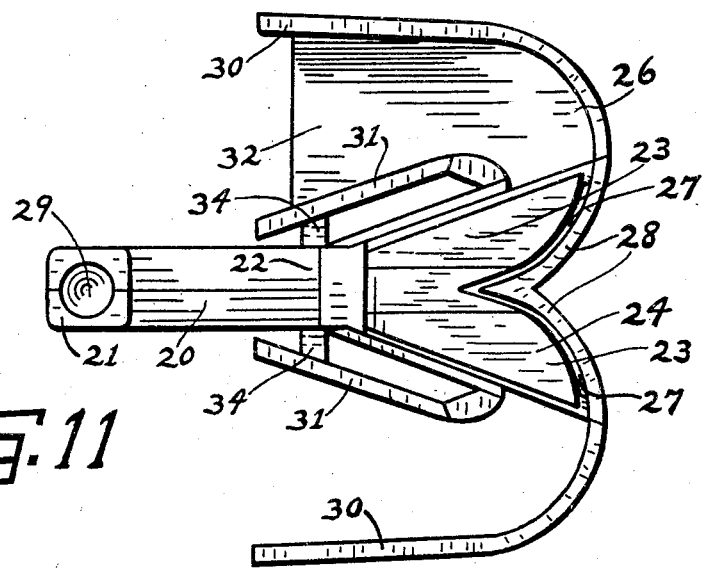
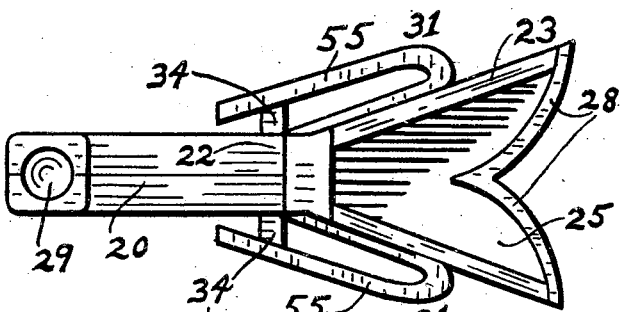
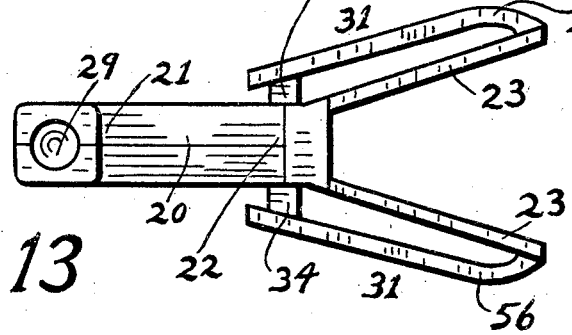

July 14, 1931.  C. A. LINTON  1,814,603
ART OF THE TRANSMISSION OF SOUND WAVES
Filed Aug. 4, 1927  7 Sheets-Sheet 7

INVENTOR.
Chester Alfred Linton

Patented July 14, 1931

1,814,603

UNITED STATES PATENT OFFICE

CHESTER ALFRED LINTON, OF KANSAS CITY, MISSOURI

ART OF THE TRANSMISSION OF SOUND WAVES

Continuation of application Serial No. 666,489, filed October 4, 1923. This application filed August 4, 1927.
Serial No. 210,657.

My invention relates to a method of and apparatus for transmitting sound waves, and the object of my invention is a device through which sound waves may be transmitted from the sound box or vibratory source to the delivery end of the device while being modified by secondary vibrations generated by the walls or certain parts of the body of the device through which the sound waves from the sound box or vibratory source are transmitted, the generic invention and a number of species thereof being claimed by me in co-pending applications, namely Serial No. 424,347, filed by me on November 16, 1920, and entitled "Phonograph sound amplifiers", and Serial No. 666,489, filed by me on October 4, 1923, and entitled "Acoustical apparatus for talking machines." In this application I shall describe and claim another form of the same invention.

This application is a continuation of my co-pending application Serial No. 666,489, referred to above, and wherein I show a plurality of members extending from a body adapted for resonance.

It will be seen this invention contemplates a plurality of tubular portions, (as well as one tubular portion), present in the construction of the device and each of these tubular portions may be adapted in whole or in part to take particular advantage of the features of structure in the novel system that constitutes a generic principle of my invention.

The principal objects of my invention are, to provide in a device of this character an improved bell portion for various phonographs and other sound projecting instruments, to provide a large sound board for all acoustical devices, having the maximum or suitable resilience and the effective shape and mass to attain the resonance frequencies ordinarily lacking in certain musical instruments and the like, to provide a similar sound board of suitable characteristics that is easily adapted for a phonograph and that is easy to assemble.

I will describe my invention as applied to a phonograph, where the sounds transmitted are amplified and where sympathetic vibration is accomplished by means of structure in resonance with the vibrating air column. I wish it understood, however, that the same system may be used for concentrating sounds in an instrument or for transmitting sounds to resonance chambers or for other purposes as may hereinafter be apparent.

Referring to the accompanying drawings,

Figure 11 is a top view of the central portions of the sound transmitting apparatus with certain parts removed to show the general construction more clearly;

Figure 12 is a similar view to what is shown in Figure 11 with less of the portions being shown, and with the divided bell portion having the upper part thereof omitted to show its interior, certain outward parts being shown in modification;

Figure 13 is a top view of the central stem or throat as shown in Figures 11 and 12, with parts of the apparatus shown by way of modification;

Figure 1:
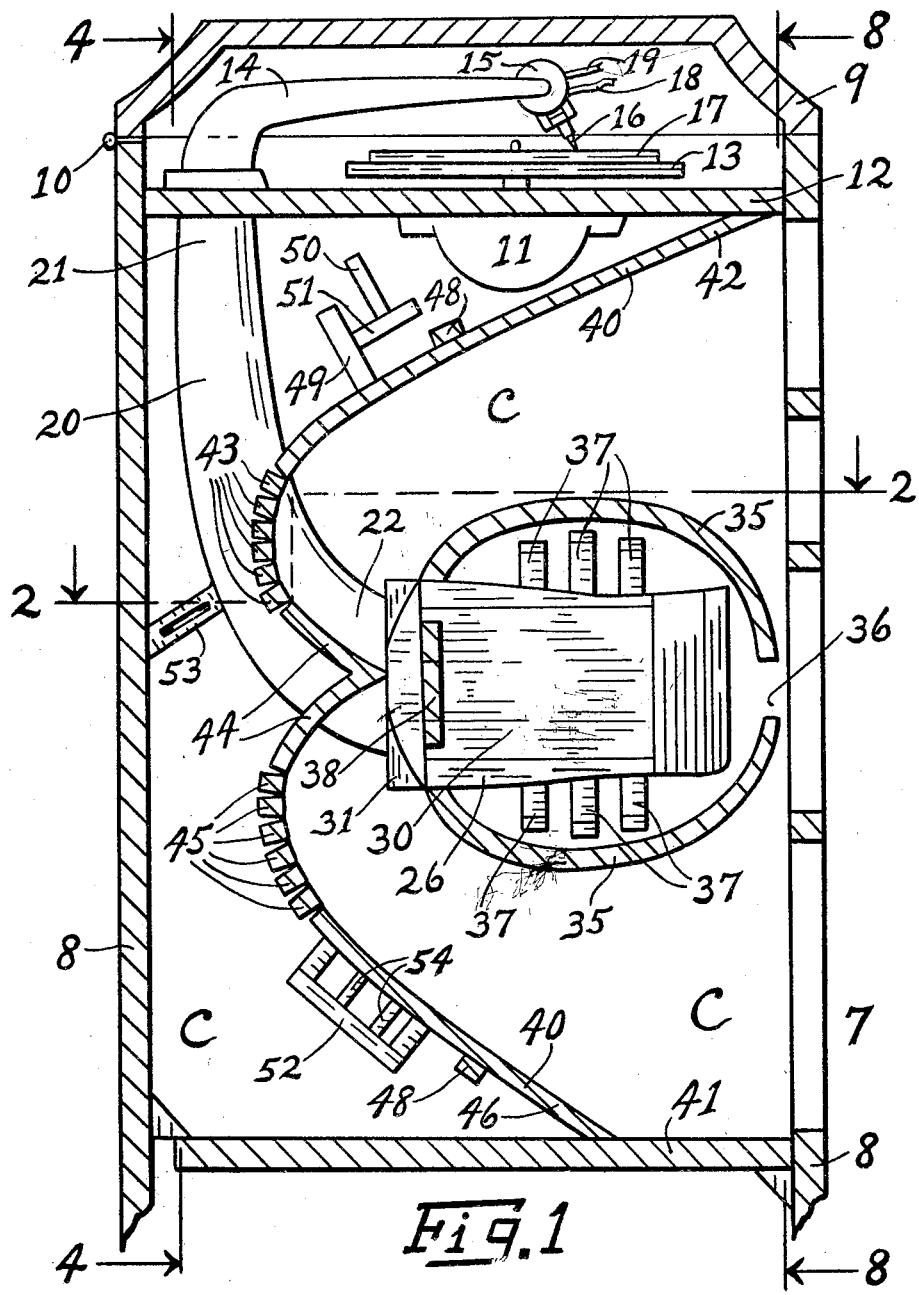
Figure 1 is a vertical sectional view taken through a phonograph, my sound transmitting apparatus shown applied therein being made in accordance with the invention.

Referring to the drawings more in detail, the numeral 7 indicates a phonograph comprising a cabinet 8 with a usual cover 9 which swings on a usual hinge 10. Numeral 11 indicates a motor hung beneath a motor board or partition 12 and connected to or associated with a turn table 13. On the partition or board 12 is mounted a swinging tone arm 14, carrying a sound box or reproducer or vibratory device 15, to which is attached in any suitable operable manner a stylus or needle or guide 16 adapted to operate over a record 17, as shown. To the sound box or reproducer or vibratory device 15, which may be adapted to operate electrically, are connected wires 18 and 19, shown merely to illustrate that this form of my invention need not be limited or restricted to one method of utilizing or impressing sound impulses in connection with the apparatus.

Below the partition 12 is a continuation of the sound transmitting apparatus adapted to register with the tone arm 14 by means of the tubular throat 20 which extends downwardly and is then curved forwardly, and the said throat preferably increases in size from the end 21 thereof to the end 22. The increase in size of the throat 20 may be relative to any or all the following factors; namely: of the effective sound energy to be impressed into use in the vibratory system, the volume of sound desired in a given instrument such as a phonograph being described, the thickness of the material forming the walls of the throat, the kind and shape of the material employed, the effective elasticity and inertia of the material present under operating conditions, and the response frequency of the material when the same is subject to stress in the sound transmitting apparatus. These same factors, as well as others, may apply to other parts of the apparatus being described, when determining the forms of the various parts and their interrelations to accomplish the objects set forth or which may become apparent as the description proceeds.

Since it is desirable that the tones emitted by an instrument come about on the level with a person listening to the same, the throat tube 20 is preferably connected with and merges into a bell portion 23 about midway of the height of the large chamber C of the cabinet. The bell portion 23 is thus extended forward leaving a sufficient air space in front and on the sides thereof for the remainder of the apparatus, the shape of the bell being arbitrary. However, in this instance, a diverging bell portion is in the construction, the top face 24 thereof and the bottom face 25 being substantially without curvature. These said faces 24 and 25 may be formed as desired, and the dividing lines shown in Figures 7 and 8 may partly serve to illustrate this point. One or more sound outlets may be provided; and, for example, connected respectively on opposite sides of, in this instance, the bell 23, are bell like members 26 arranged to continue the air passage or tubular part of the apparatus. These bell like members may be positioned as desired and unite at any point with the tube if suitable; however, their divergent positions in the form shown are in a direction the reverse to the bell 23, their small or narrow ends being adjacent the large end of the bell 23. The connections are so made and the air passage so continued as to leave a sound hole 27 in the upper part of the bell 23 adjacent the forward end thereof, and the said sound hole preferably extends the full width of the bell 23 and, by reason of the division of the air passage into a plurality of outlets, there is left or provided, in this instance, a curved V-shaped wall 28 forming the outer side or forward part of the bell 23; and the inner point of this V-shaped wall may serve to divide the bell 23 into two chambers or parts toward the outer extremity thereof. Thus it is seen that the impressed sound waves may be deflected to either side of the apparatus or of the bell 23 through the air passage 29 and into the bell like members 26.

Figure 2:
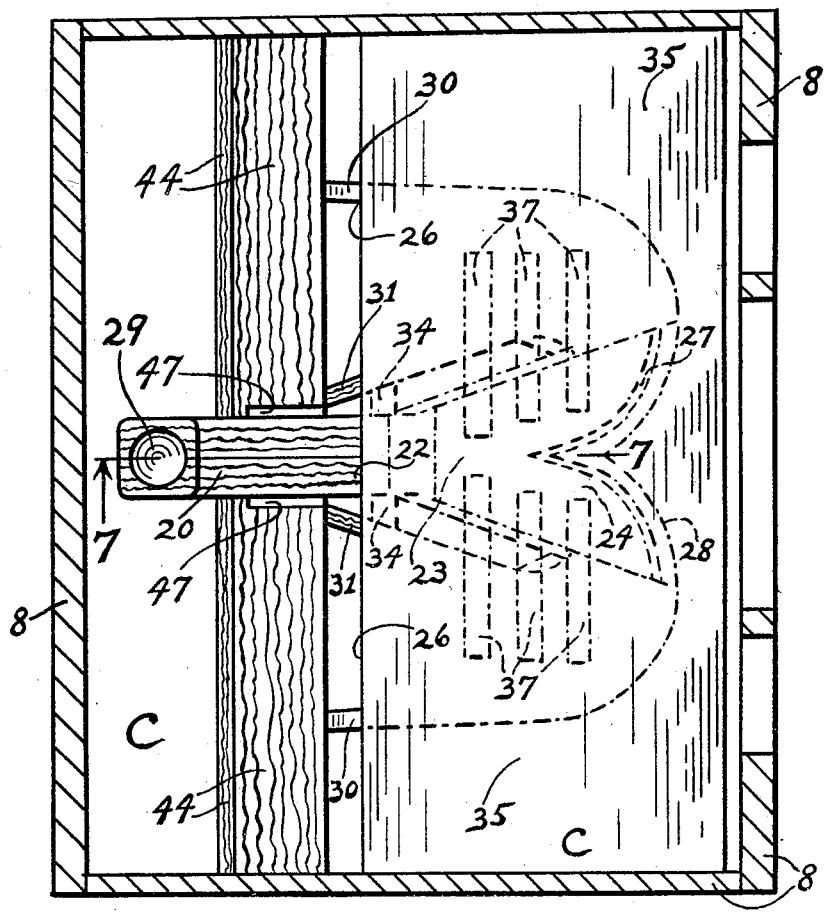
Figure 2 is a horizontal sectional view taken on the broken line 2—2 of Figure 1, certain features being shown out of scale for purposes of illustration, parts of the amplifying portions being shown in dotted lines as through one sound board member.
Figure 6:
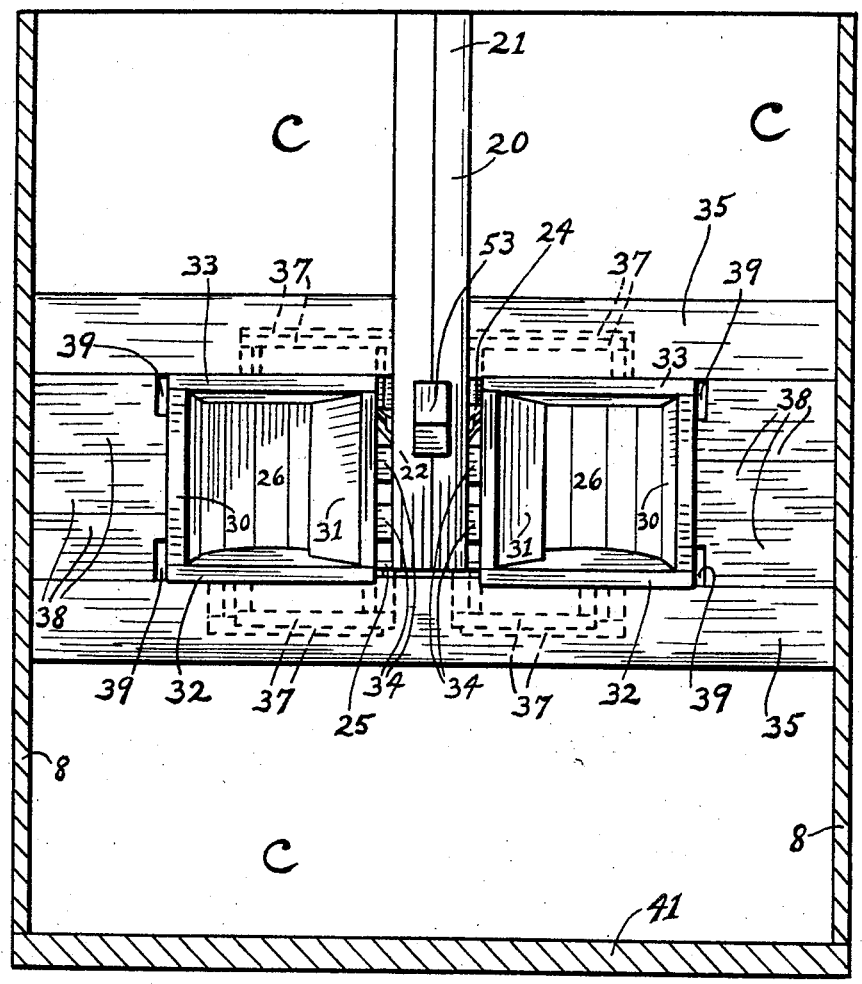
Figure 6 is a view similar to Figure 4 with the large sound board omitted, thus showing the tubular outlets on either side of the central stem of the sound transmitting system.
Figure 7:
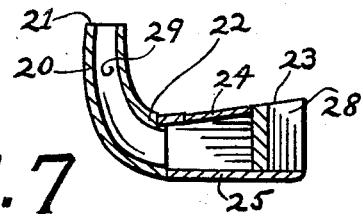
Figure 7 is a central vertical sectional view of substantially what is shown in the drawings in Figure 2, of the throat tube and the central bell of the apparatus, and is taken on the line 7 of Figure 2, on a reduced scale.
Figure 8:
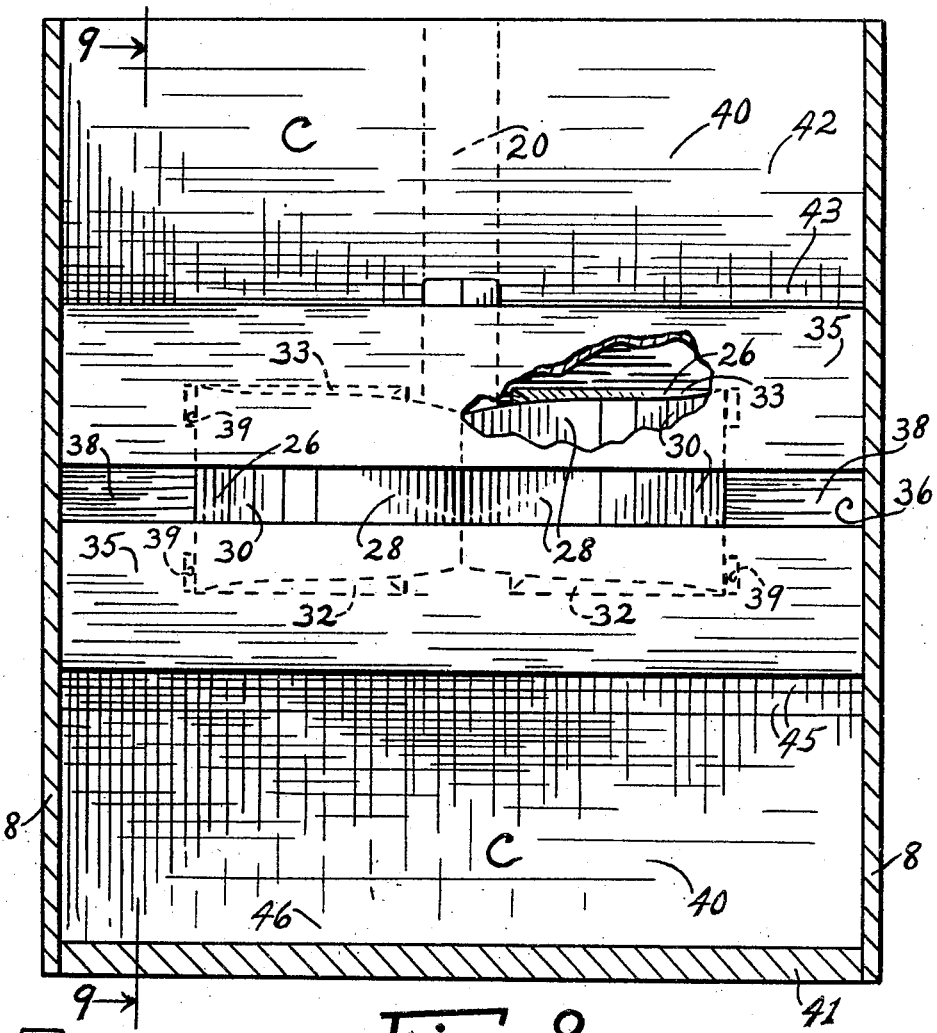
Figure 8 is a front view taken through the cabinet below the motor board on the line 8—8 of Figure 1, showing a part broken away and showing tubular portions partly enclosed by opposed sound boards.

The outer walls 30 and the inner walls 31 of bell like members 26 may have suitable curvature, and the said wall 28, illustrated in the form shown in Figure 7, joins or continues in effect as an integral wall with the curvatures of the walls 30. The bell like members 26 may have two or three or more walls, (see Figure 7), and when four walls are provided the said walls 30 and 31 and the lower walls 32 and the upper walls 33 may diverge, for example, rearwardly, and orifices or outlets of the completed bell like members 26 may be suitably arranged adjacent the end 22 of the throat tube 20; in this case the ends of said members 26 are laterally disposed respectively as indicated in Figures 1 and 2 with orifices at right angles to the throat tube 20, with surfaces of said orifices in alinement one with the other; in other words, there is a balanced pair of effective vibratory elements to the right and left of the central stem of the sound transmitting apparatus. Each lower wall 32 and each upper wall 33 may terminate short of the end of its respective supporting wall or walls. The inner walls or resonant bodies 31 may be respectively connected to the end 22 of the throat tube 20 with one or more resonant elements 34, as indicated in Figure 6, thereby permitting certain vibratory impressed impulses of a properly calculated or measured frequency to enter the said walls or bodies 31 from the said tube 20 through the said elements 34 or the like.

Figure 9:
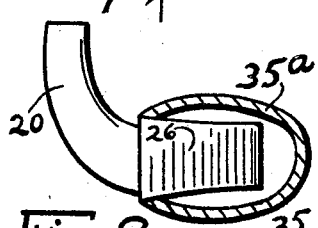
Figure 9 is a side elevation partly in section of a modification taken on a line similar to line 9—9 of Figure 8.
Figure 10:
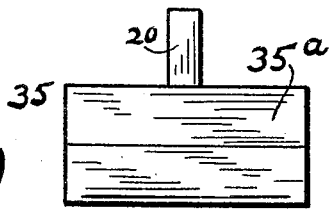
Figure 10 is a front elevation of what is shown in Figure 9.

Arranged upon opposite sides of the bell like members 26 may be suitable sound boards of preferably equal area and of like characteristics, and preferably their response frequency characteristics in the combination are prefigured or calculated by experiment,— as this latter factor is of particular value in an apparatus of this generic type. Sound boards or the like 35, for example, are connected in any desired manner to, and spanning, outlet ends of the respective walls 32 and 33, to form bridge like members transversely of the bell sections of the apparatus. The construction may be such as to form an unbroken bridge from one tube or bell like member 26 to the other tube or bell like member 26, and, also, the construction may be such as to extend laterally beyond the bell like members 26, and, also, it may be such as indicated in Figure 6, the sound board bridge like members 35 being shown securely connected straight across from one side to the other side of the cabinet 8. In this latter form the said members 35 may contact with tube 20, or slight air gaps may be left between tube 20 and said members 35: as to this, other features of construction may be considered. Members 35 may form a spaced apart encircling hoop about the forward part of the bell sections, Figure 9, being in this figure as one member by reason of the juncture of the parts; likewise, members 35 may have any desired shape in cross section, such, for instance, as forming a portion of an imaginary ellipse, circle or rectangle. Further, said members 35 may partially encircle forward parts of the bell sections. As illustrated in Figures 1 and 6 the said members 35 are spaced away from the bell portion 23 and from the lower part of the end 22 of the tube 20 and from the bell like members 26, except as before stated, and this particular construction leaves an open space in front of the apparatus or of the bell sections, thereby affording an outlet for the sound vibrations when the apparatus is in use. In this manner said members 35 may have a horizontal air space, as indicated at 36, between their forward terminations that is of any desired width. No attempt has been made to have the drawings answer the purpose of shop drawings, therefore the scale to which the various views are drawn is not to be considered as a limitation or restriction of this form of my invention.

In the combination of the parts of this apparatus and spaced from and inside or adjacent sound boards 35 may be a plurality of elevated bridge like vibratory members 37 respectively connecting desired points on the bell 23 with desired points on the bell like members 26. In Figures 1 and 6 said members 37 are shown in the construction as being on the upper and lower sides respectively of the bell sections and connected thereto as may be desired or possible and transversely of the bell sections. Connecting the sound boards 35 to each other and connecting the outlet or diverging ends of bell like members 26 on the outer sides of same with cabinet 8 are in this instance provided sound boards 38, as shown in Figure 6. Air spaces such as indicated at 39 may be provided if desired, and any kind or shape of such air spaces may be omitted in some combinations. A large sound board 40 may extend from partition 12 to partition or sound board 41 of cabinet 8, for example, as indicated in Figure 1, and sound board 40 may be in effect and in fact a continuous board and be effective like continuous surfaces in the position it may occupy. In one form of construction sound board 40 is formed of a series of segments 42, 43, 44, 45 and 46 respectively connected edge to edge and with portions of the sides of said segments in this instance respectively securely connected. Segment 42 is connected to partition 12 adjacent the opening in cabinet 8 like the remaining segments, and to the said tube 20. Segments or sound boards 43 are connected to the throat tube 20 on opposite sides thereof respectively. Segment 44, constituted in this instance by a V-shaped board, which may be carved out centrally in this case to receive the throat tube 20 therethrough, is connected centrally, Figure 4, with the throat tube 20. Air spaces 47 adjacent said tube 20 may be provided if desired, and air spaces such as 47, for example, may be omitted in one form of construction. Segments 45 extend straight across, preferably in parallel relation, from one side to the other side of cabinet 8. Segment 46 is connected to the lower partition or sound board 41 of cabinet 8 near the opening of said cabinet and extends diagonally rearwardly across cabinet to complete sound board 40. Sound board 40 is shaped in this example to form a bifurcated continuation of expanding tubes having their outlets merging into the atmosphere at the forward part of the cabinet. Sound board 40, or any part thereof, may be of any desired shape, size or tension and may be formed of material without segments therein. It is shown held under tension or secured by a plurality of abbreviated wires or the like or similar elements connected to member 52 and numbered 54; and these said wires or elements may be connected in any of the positions of the other members where novelty results. Sound board 40 may contact or connect with bell like members 26, as shown, Figure 1. It is understood that a high tension put upon the sound boards between the cabinet walls would cause the cabinet walls to buckle outward if strained too much.

Figure 3:
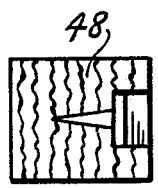
Figure 3 is a central vertical sectional view of what is shown by numeral 48, showing an internal air space in the member.
Figure 4:
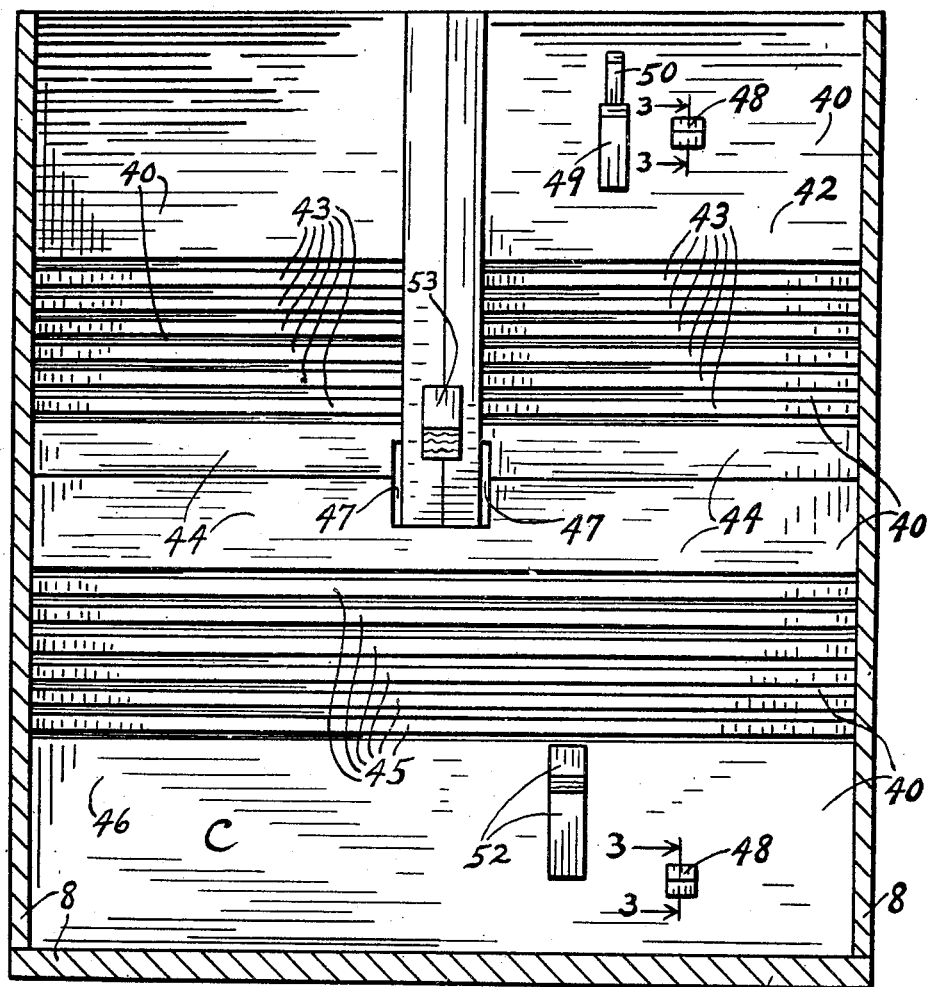
Figure 4 is a rear view taken through the phonograph cabinet below the motor board on the line 4—4 of Figure 1, showing one support member of the tube of the sound transmitting system in section, and showing the manner in which the large sound board can be built up.
Figure 5:
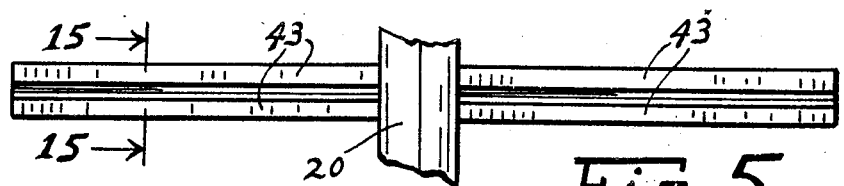
Figure 5 is a fragmentary view of the tube, showing sound boards connected on each side thereof.

In Figures 1 and 4 are shown vibratory members 48, 49 and 52 that may be attached to sound board 40 at any desired point thereon; and in Figure 3 is illustrated one size and shape that members 48 may take. Vibratory member 49 is shown, for example, as being formed of a plurality of parts which may be united in any desired manner, the part 50 thereof being shown connected to part 51, which may permit, at certain inclinations, of acoustic torsion in the sound board 40. Vibratory member 52, shown in one position as formed of a plurality of elements, may be arranged transversely of sound board, or at any desired angle or slope thereto, as may be desired. Said member 52 may be of the same or of different structure than sound board 40, and it also may be formed of one integral piece. Another form of member 53 may connect the throat tube 20 with an adjacent wall of cabinet 8, shown in Figure 1 at an angle to and between the parts named.

Figure 14:
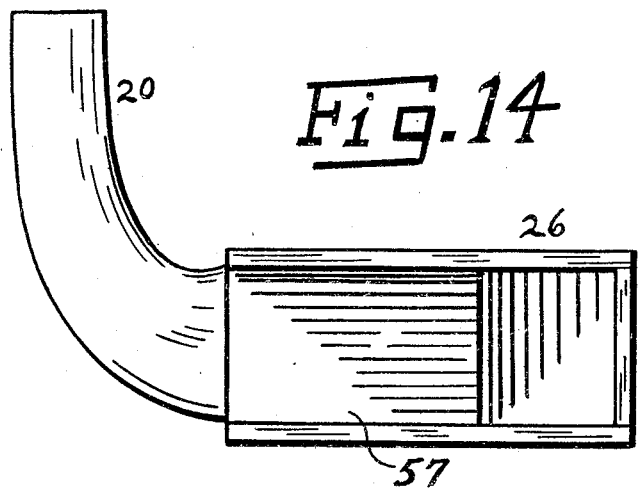
Figure 14 is a side elevation of a modified form of the tubular portions shown in Figure 12, showing one side of the outer bell-like portion open for emitting and for resonating the sound.
Figure 15:
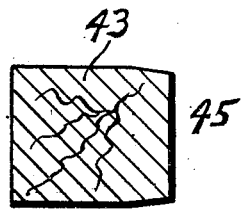
Figure 15 is a transverse sectional view taken on the line 15—15 of Figure 5, of one of the segments forming the large sound board shown as extending from side to side of the device.
Figure 16:
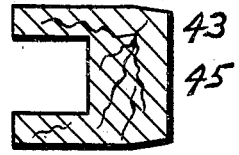
Figures 16, 17 and 18 are transverse sectional views of modified forms of what is shown in Figure 15.
Figure 17:
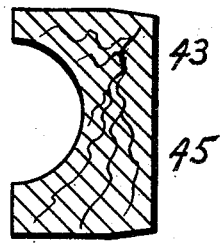
Figure 18:
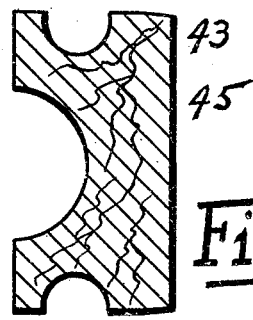

The form shown in Figure 12 may be useful as illustrated, i. e. without a top face to the portion of bell 23 shown. Members shown as exterior members 55, which may be interior members in one form of construction, are connected to the device. In the modification shown in Figure 13, vibratory members 56 are connected to the diverging walls. Nor is it deemed necessary to say that the walls may be of any known material, if a new result may be accomplished within the scope of this invention. The modification in Figure 14 may have a bell like member 57, similar to one member 26 but with one side open, and having walls that are parallel to each other.

It is an important function of this sound transmitting apparatus to bring about and to properly transmit and communicate sympathetic vibration of calculated characteristics to certain resonant parts of said apparatus, to be able to obtain certain music and voice frequencies needed to mimic the original sounds, (see my first mentioned co-pending application for patent, wherein means are described for utilizing vibrations in an acoustic device). For example, when acoustic waves or vibratory impulses are impressed into use by means of sound box or reproducer or vibratory device, such as shown for instance in the drawings, the acoustic waves or impulses will progress through the tube members, the selected sound boards will have response frequencies according to conditions imposed on them in structural relations and their elastic masses will therefore have their effect upon the vibrating air column to produce the desired effect.

The plurality of sound outlets increases the volume of acoustic waves over that that may be obtained with an ordinary small amplifier. This form of my invention contemplates a plurality of tubes or series of tubes arranged in any desired manner, to which may be adapted the structural features of the generic principles of my invention. A plurality of air passages is illustrated in my second named co-pending application for patent, and vibratory members or sound boards of various shapes, sizes, placements, etc., are described and claimed in both my hereinbefore named co-pending applications for patent; therefore further explanation here may be unnecessary. This application for patent is not to be considered as a limitation or restriction in any manner whatsoever of my herein before mentioned co-pending applications for United States Letters Patent.

By having a sound hole in the bell portion, more resiliency is obtained and the amplitude of vibration correspondingly increased. A perfectly rigid bell would reduce the efficiency of the tube and of the sound transmitting apparatus. Due to the V-shaped arrangement, if the V-shaped wall, in this instance, of the central bell were attached firmly throughout its upper edge to the upper wall of said bell, the stiffness factor of the transmitting system would not allow said upper wall to vibrate freely. I claim a sound hole in my said co-pending application for Patent Serial No. 666,489. The sound hole may be omitted in one form of construction, thinness of material being recognized as desirable.

As shown, vibratory effects may have either a mechanical or electrical source that are employed in producing the results here sought.

The invention is designed for use not only in the radio art, but in other acoustic fields, including the phonographic art and the production and reproduction of music and speech. The same system of transmitting acoustic or vibratory impulses may have other uses, or be used in or with other systems. It will often be useful to employ the invention in one aspect only, as well as in any suitable combination.

What is claimed is:

1. In an acoustic device, sheet material adapted for vibratory purposes, and abbreviated filamentous means connected therewith, said means at angles to particular parts only of said sheet material for tensioning the same, and for operatively vibrating therewith, the relations of elasticities and masses in said sheet material and in said means being found in the adaptation, whereby the use of said means in connection therewith obtains differing properly spaced areas of resonance for a required scale of forced frequencies.

2. An acoustic device for radio use, comprising sheet material for receiving and distributing resonance, and tuned tensioned means of small mass connected with a point thereof for introducing by natural frequency means a vibratory strain therein.

3. An acoustic device comprising a sound board, and means of determined frequency, said means operably engaged against a selected surface of said sound board and preferably in line with a point of decided resonance therein, primarily to introduce a tuned stress otherwise absent therein, whereby resonance frequencies thus individually controlled in said sound board will be of calculated effectiveness.

4. In an acoustic device, a sounding element of determined frequency, an adjacent individual support member fixed thereto, and short vibratory securing means between said sounding element and said support member for permanently tensioning a given area only of said sounding element, whereby resonance frequencies have appreciable junction and harmony with the path of origin.

5. An acoustic device comprising enclosing walls, a flexible diaphragm element, said element supported by and connected between said walls, and elevated means of substantially no mass bearing against said element thereby to indirectly introduce a desired strain therein, for the purpose of attaining the full range of voice frequencies from said device.

6. In an acoustic apparatus, a sound board coextensive therewith, resonant members in spaced relation thereto, and a tubular body having two outlets, said body being joined with said sound board, thereby having a large reflecting surface for sound impulses focussed upon said sound board from said tubular body, and thereby changing the composition of the sound waves progressing through the walls of said tubular body, and thereby dividing the sound at least twice, so that secondary sound impulses progressing through said resonant members will come into play transversely of the apparatus and on upper and lower sides of the apparatus coextensive therewith.

7. In an acoustic apparatus, a sound board, and a tube, said tube projecting through said sound board and centrally thereof, and a plurality of bell portions, said bell portions being continuations of said tube, and a plurality of curved sound boards connecting said bell portions, thereby increasing the volume of sound by utilizing its energy in having sympathetic vibration in the sound boards.

8. The combination with an acoustic device, of a sound board comprising a series of parallel segments of the substantial width of said device, said segments free to move at their inner edges and adapted to transmit resonance to each other at their outer edges.

9. In an acoustic apparatus, a tubular body having a divided bell portion, said bell portion having exits and a narrow supplemental sound hole the full width thereof, thereby increasing the effectiveness of the acoustic range adapted to said bell portion.

10. In combination, an acoustic apparatus having a tubular body and a plurality of bell portions and a sound board, said bell portions being connected with said sound board and provided with exit for sound, said bell portions having resonant walls and being in size and placement relative to the general construction of said tubular body, and said bell portions being further relative to the direct communication of resonance in the apparatus, thereby to increase the range of frequencies of sound while said tubular body is in operation.

11. An acoustic device comprising a cabinet, a resilient tensioned body secured on all sides to said cabinet, and tensioning means secured with said body and comprising resilient members of sizes determined by the resonance frequency of said body under stress in said cabinet.

12. In a vibratory device, a cabinet, a tubular passage, a plurality of outlets to said tubular passage, and a tuned sound board engaged normally with a side of said tubular passage and with a side of said cabinet, whereby resonance frequencies of determined time will be reflected into the atmosphere by said sound board.

13. In a vibratory device, a cabinet, a tubular passage, and a sound board connected therewith, said sound board directly engaged with a part of said cabinet, whereby sound impulses of a predetermined frequency will be transmitted to said part, 14. In an acoustic device, spaced walls, a tubular passage, and a resonant member, said member normally disposed between said walls and said passage and connected with said walls and said passage, thereby introducing a measured strain in said walls while in vibration.

15. In a vibratory device, a cabinet, a tubular passage, said tubular passage having a plurality of outlets, and a sound board of a measured rate of frequency spanning said outlets, said sound board being disposed against and directly engaged with an inside surface of said cabinet, whereby vibratory impulses of a particular time rate will be transmitted by means of said sound board to and from said cabinet.

16. An acoustic device comprising in mutual combination a cabinet, a tubular member, said tubular member having a plurality of bell bodies, and in adjacency, vibratory means connecting said bell bodies and said cabinet, said means being adapted for an equalization of resonance throughout the music scale of frequencies between said bell bodies, thereby communicating frequency values generated by the walls of one of said bell bodies to the other of said bell bodies by reason of said adjacency.

17. In an acoustic apparatus, a cabinet, and a tubular body having a plurality of compound curved expanding air passages, said air passages being of carefully calculated and interrelated proportions primarily gaged by frequency values of sound impulses ordinarily missing in common tubes of the sort, said air passages having a central stem in transverse connection with said cabinet, whereby vibratory energy is communicated to the atmosphere.

18. In an acoustical apparatus adapted for mechanical and for electrical vibration, a tubular body and a vertical wall, and resonant means for securing said tubular body to said wall without loss of resonance, whereby said tubular body will be spaced a distance from said wall, measured by the ratio of the range of frequencies in use at a particular time to the ability of said means to respond to and change the composition of said range of frequencies in the position occupied in construction.

19. The method of reproducing music frequencies, which comprises directing sound waves through a resonant tubular body to produce a strengthening of the forces and then further positioning the sound waves by means of surrounding resonant bodies to have reinforcement and interference of the sound waves at certain divided and prefigured arcs, in such manner that the resonant bodies will cause certain overtone waves to overtake other overtone waves in a chromatic series necessary for the frequency relation of the original music.

20. The method of transmitting sound waves, which comprises directing sound waves through resonant bodies to have an increase of the initial inherent forces and then positioning the sound waves by means of paired bodies arranged in such manner that a particular combination of overtone waves will overtake other particular combinations of overtone waves in a desired series necessary to simulate the original music.

Signed at Kansas City, in the county of Jackson and State of Missouri.

CHESTER ALFRED LINTON.